United States Patent
Knyrim et al.

(10) Patent No.: US 12,491,566 B2
(45) Date of Patent: Dec. 9, 2025

(54) DUST PROTECTION CAP WITH VIBRATION DECOUPLING

(71) Applicant: Hilti Aktiengesellschaft, Schaan (LI)

(72) Inventors: Maximilian Knyrim, Ehingen (DE); Udo Hauptmann, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 902 days.

(21) Appl. No.: 17/619,475

(22) PCT Filed: Jul. 1, 2020

(86) PCT No.: PCT/EP2020/068497
§ 371 (c)(1),
(2) Date: Dec. 15, 2021

(87) PCT Pub. No.: WO2021/004849
PCT Pub. Date: Jan. 14, 2021

(65) Prior Publication Data
US 2022/0097147 A1    Mar. 31, 2022

(30) Foreign Application Priority Data
Jul. 11, 2019   (EP) ..................................... 19185765

(51) Int. Cl.
*B23B 31/00*    (2006.01)

(52) U.S. Cl.
CPC ........ *B23B 31/001* (2013.01); *B23B 2231/28* (2013.01); *B25D 2217/0069* (2013.01)

(58) Field of Classification Search
CPC .............. B23B 31/001; B23B 2231/28; B23B 2231/44; B25D 2217/0069
See application file for complete search history.

(56) References Cited

U.S. PATENT DOCUMENTS

| 4,664,394 | A | * | 5/1987 | Theissig | B23B 31/001 277/641 |
| 5,470,084 | A | * | 11/1995 | Reibetanz | B23B 31/1238 279/62 |
| 9,221,165 | B2 | * | 12/2015 | Wiedner | B25D 17/088 |
| 9,676,038 | B2 | * | 6/2017 | Hauptmann | B25D 11/005 |

(Continued)

FOREIGN PATENT DOCUMENTS

| CN | 1988983 A | 6/2007 |
| CN | 101203348 A | 6/2008 |

(Continued)

OTHER PUBLICATIONS

International Search Report of PCT/EP2020/066743, dated Sep. 25, 2020.

*Primary Examiner* — Eric A. Gates
(74) *Attorney, Agent, or Firm* — Davidson Kappel LLC

(57) ABSTRACT

Tool fitting device for a power tool, in particular a chipping hammer, including a holding device for receiving and holding a tool shank, a tool cap, and a dust protection device for preventing the penetration of dust into the tool fitting device. The tool cap includes at least one receiving element and the dust protection device includes at least one protruding element corresponding to the receiving element, such that the tool cap and the dust protection device are able to be connected together in a form-fitting manner. Dust protection device for use in a tool fitting device.

8 Claims, 5 Drawing Sheets

(56) References Cited

U.S. PATENT DOCUMENTS

| | | |
|---|---|---|
| 2003/0089509 A1 | 5/2003 | Wanek et al. |
| 2007/0024013 A1* | 2/2007 | Hauptmann ............ B25D 17/24 |
| | | 279/75 |
| 2007/0110530 A1 | 5/2007 | Baumann et al. |
| 2011/0298187 A1* | 12/2011 | Ontl .................... B25D 17/088 |
| | | 173/210 |
| 2014/0174777 A1 | 6/2014 | Kakiuchi et al. |
| 2017/0057073 A1 | 3/2017 | Meixner et al. |

FOREIGN PATENT DOCUMENTS

| | | | |
|---|---|---|---|
| CN | 102596512 A | 7/2012 | |
| CN | 103904809 A | 7/2014 | |
| CN | 106029304 A | 10/2016 | |
| DE | 3406482 C2 * | 10/1992 | |
| DE | 3617105 C2 * | 5/1995 | ........... B23B 31/123 |
| DE | 4419826 A1 | 12/1995 | |
| DE | 102012223094 A1 * | 6/2014 | ........... B25D 17/088 |
| EP | 2910337 A1 | 8/2015 | |
| FR | 1415708 A * | 10/1965 | |
| GB | 2290043 A * | 12/1995 | ......... B23B 31/1238 |
| JP | 2017119318 A | 7/2017 | |

\* cited by examiner

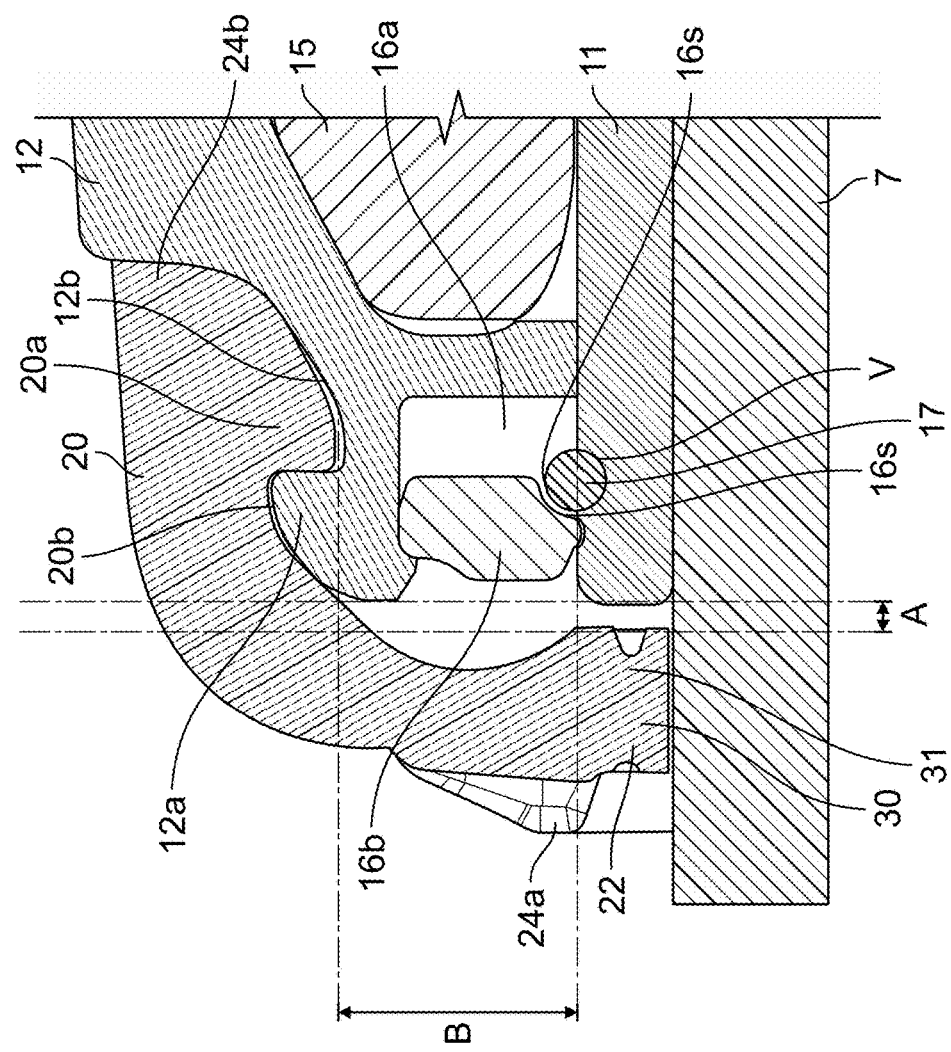
Fig. 3
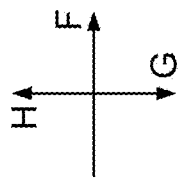

DUST PROTECTION CAP WITH VIBRATION DECOUPLING

The present invention relates to a tool fitting device for a power tool, in particular a chipping hammer, comprising a holding device for receiving and holding a tool shank, a tool cap, and a dust protection device for preventing the penetration of dust into the tool fitting device.

Furthermore, the present invention relates to a dust protection device for use in a tool fitting device.

SUMMARY OF THE INVENTION

When working with power tools and in particular when working with a chipping hammer on mineral materials (for example concrete or stone), dust may arise. Such dust can pass into the interior of a power tool through small openings, for example a gap between mutually adjoining housing parts. The dust, particularly mineral dust, can have a not inconsiderable abrasive effect on moving parts on components of the power tool. Damage to individual components of the power tool or even failure of the entire power tool may result from the abrasive wear. When working with power tools and in particular when working with chipping hammers, vibration arises at the components and parts of the power tool. As a result of this unavoidable vibration, virtually all the components of the power tool may move relative to one another. Penetrating dust that passes between vibrating components promotes and accelerates the wear of the components. Small components, for example retention elements, are particularly susceptible to vibration and to the abrasive effect of the penetrating dust.

The dust protection device and tool fitting device having a dust protection device of the type mentioned at the outset are known in principle from the prior art but often provide only insufficient protection, i.e. sealing features, against penetrating dust.

It is an object of the present invention to provide a tool fitting device and a dust protection device for use in a tool fitting device, by way of which the penetration of dust into the interior of a tool fitting device can be prevented more effectively.

The present invention provides a tool fitting device for a power tool, in particular a chipping hammer, comprising a holding device for receiving and holding a tool shank, a tool cap, and a dust protection device for preventing the penetration of dust into the tool fitting device.

According to the invention, the tool cap comprises at least one receiving element and the dust protection device comprises at least one protruding element corresponding to the receiving element, such that the tool cap and the dust protection device are able to be connected together in a form-fitting manner.

As a result, penetration of dust and dirt into the interior of the tool fitting device can be prevented in a simple manner. Furthermore, vibrational decoupling between the dust protection device and holding device is created, such that the holding device that creates significant vibration when the power tool is used is not directly connected to the dust protection device and consequently also only little vibration is transmitted from the holding device to the dust protection device.

According to an advantageous embodiment of the present invention, it may be possible for the dust protection device to comprise at least one receiving element and the tool cap to comprise at least one protruding element corresponding to the receiving element. In this way, an even better form-fitting connection can be created between the dust protection device and the tool cap and dust can be kept effectively out of the interior of the tool fitting device.

According to an advantageous embodiment of the present invention, it may be possible for the dust protection device to be formed at least partially from a resilient material. As a result, it is possible for the dust protection device to be able to be elastically deformed at least partially in order to fasten the dust protection cap to the tool fitting device and remove it from the tool fitting device again in an undamaged manner. Furthermore, the use of a resilient material allows vibration and oscillation to be absorbed.

According to an advantageous embodiment of the present invention, it may be possible for a radial spacing and/or an axial spacing to be provided between the dust protection device and the holding device. This ensures that the dust protection device and the holding device are always separated or decoupled from one another, such that no vibration or oscillation is transmitted from the holding device to the dust protection device.

According to an advantageous embodiment of the present invention, it may be possible for the dust protection device to comprise an annular fixing bead and the holding device to comprise a depression corresponding to the fixing bead for axially holding the dust protection device on the holding device. As a result, the fixing bead is connected to the holding device in a form-fitting manner such that it is possible to prevent the dust protection device from being pulled off the holding device too easily. Furthermore, when the fixing bead is located in the depression, it is possible to ensure that the dust protection device is positioned properly on the holding device. The depression can also be referred to as a groove extending around the holding device.

According to an advantageous embodiment of the present invention, it may be possible for the dust protection device to comprise a front and a rear end, wherein a frustoconical recess that extends around the holding device is provided at the rear end. This makes it possible to avoid the rear end of the dust protection device butting against the retention element and/or against the holding device when vibration acts on the dust protection device.

Furthermore, the present invention provides a dust protection device for use in a tool fitting device according to at least one of the abovementioned configurations.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures:

FIG. 3 shows a sectional illustration with details of the first embodiment of the dust protection device according to the invention;

DETAILED DESCRIPTION

Figure 1:
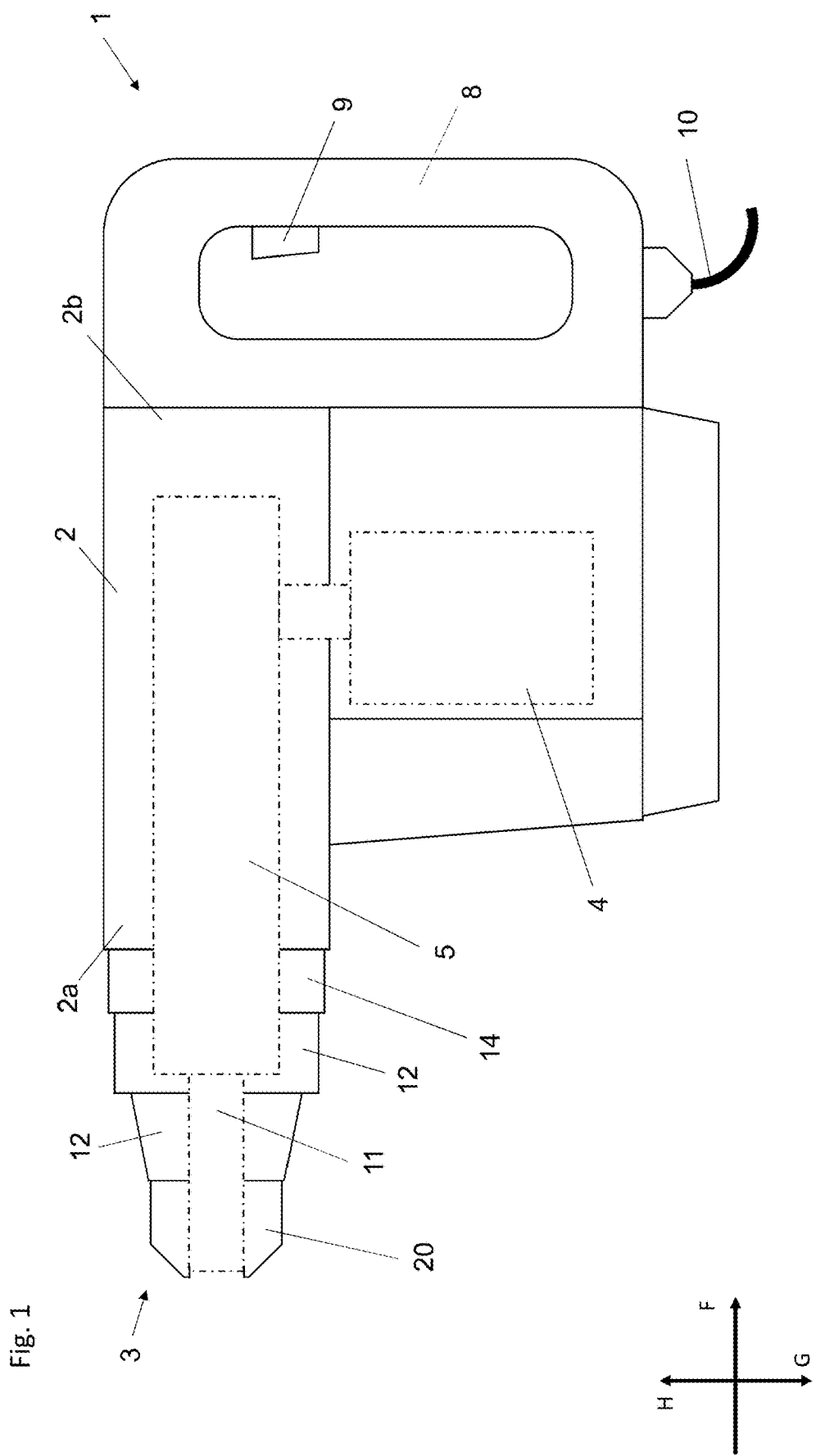
FIG. 1 shows a schematically illustrated power tool in the form of a chipping hammer having a tool fitting device according to the invention and a dust protection device according to the invention.

FIG. 1 illustrates a power tool 1 in the form of a chipping hammer. Alternatively, the power tool 1 can also be in the form of a hammer drill, a power drill or a combination hammer. A combination hammer is a combination of a hammer drill and a chipping hammer. Furthermore, the power tool may also be a saw, in particular a reciprocating saw.

The power tool 1 illustrated in FIG. 1 comprises substantially a housing 2, a tool fitting device 3, a drive 4, an impact mechanism 5 and a holding device 11. The drive 4, the impact mechanism 5 and the holding device 11 are positioned in the interior of the housing 2 of the power tool 1. The drive 4 is in the form of an electric motor and is connected to the impact mechanism 5 and the holding device 11 in the interior of the housing 2 such that an impulse produced by the drive 4 and the impact mechanism 5 is transmitted to a tool 7 (See, e.g., FIG. 2) located in the holding device 11.

The tool fitting device 3 shown in FIG. 1 schematically represents both a first and a second embodiment of the tool fitting device 3.

The housing 2 has a front end 2a and a rear end 2b. A handle 8 having an activation switch 9 is positioned at the rear end 2b of the housing 2. By way of the handle 8, the power tool 1 can be held and guided by a user. The activation switch 9 is used to operate or activate the power tool 1 and in particular the drive 4 and the impact mechanism 5. The user is not shown in the figures.

There is furthermore a mains cable connection 10 at the rear end 2b of the housing 2 of the power tool 1. The mains cable belonging to the mains cable connection 10 is only indicated in FIG. 1. By way of the mains cable connection 10, the power tool 1 can be supplied with electrical power from a network (for example plug socket). Alternatively, the power tool 1 can also be supplied with electrical power by a rechargeable battery connected to the power tool 1. The rechargeable battery is not shown in the figures.

Figure 2:
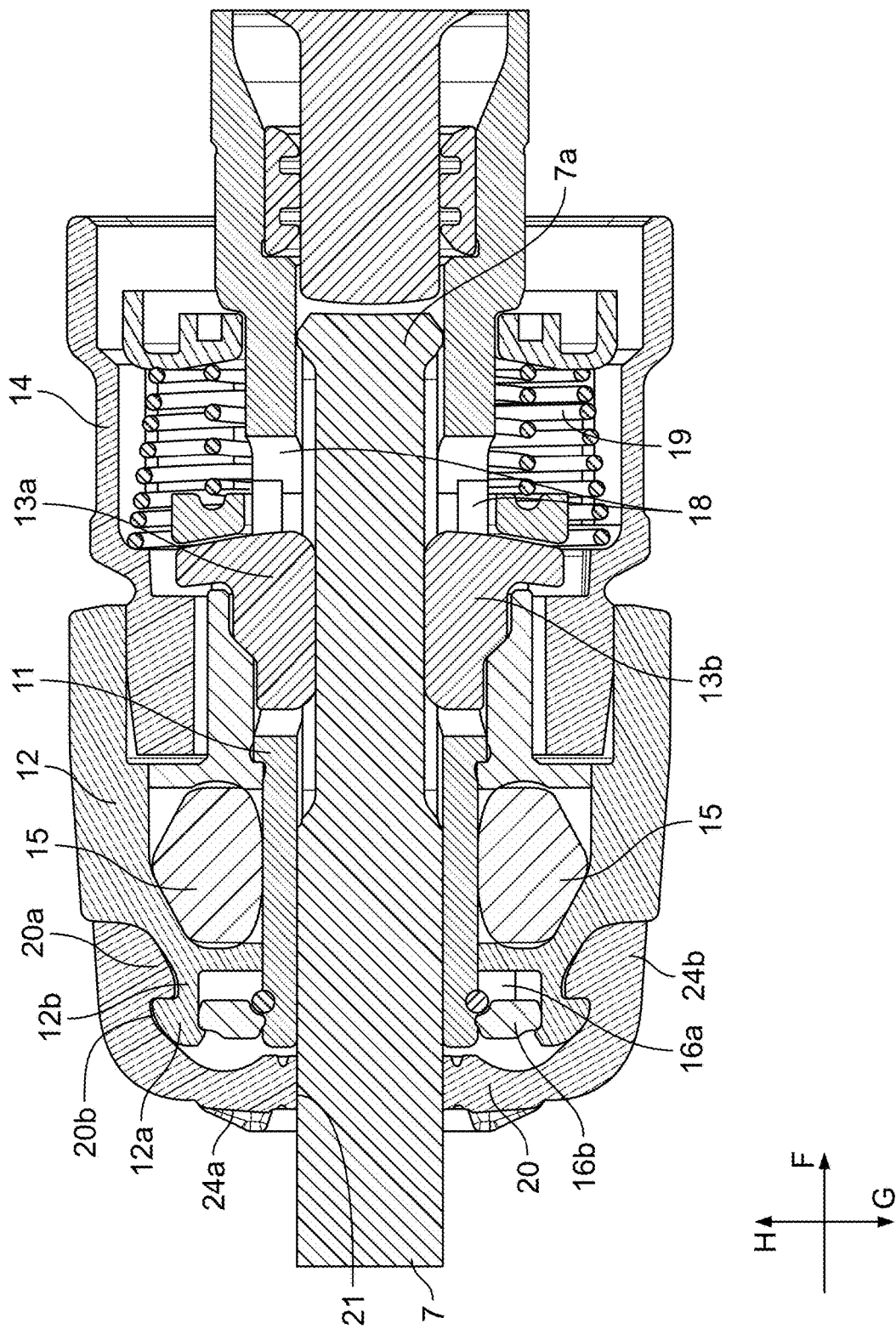
FIG. 2 shows a sectional illustration of a first embodiment of the tool fitting device according to the invention, having the dust protection device according to the invention and a tool shank inserted into the tool fitting device.

The tool fitting device 3 is positioned at the front end 2a of the housing 2 of the power tool 1. The tool fitting device 3 serves to receive and hold a tool 7. In the present configuration of the power tool 1 and of the tool fitting device 3, the tool 7 is in the form of a chisel. FIG. 2 shows a rear end 7a of the tool 7 configured as a chisel. The rear end 7a of the chisel may be referred to as a shank, chisel shank or tool shank.

The tool fitting device 3 comprises substantially the holding device 11, a tool cap 12, two locking pawls 13a, 13b, a release device 14, a damping element 15, a first holding ring 16a, a second holding ring 16b, and a retention element 17.

As indicated in FIGS. 1 and 2, the holding device 11 is configured substantially as a cylindrical tube into which the tool shank 7a can be inserted. The holding device 11 configured as a cylindrical tube furthermore has openings 18, in which the locking pawls 13a, 13b are positioned. The locking pawls 13a, 13b may also be referred to as holding jaws. The locking pawls 13a, 13b can be set in a holding position or a release position by the release device 14. With the aid of the locking pawls 13a, 13b, which project through the openings 18 in the holding device 11, the tool shank 7a can be secured in the holding device 11 against falling out axially when the locking pawls 13a, 13b are in the holding position (cf. FIG. 2). In this case, the locking pawls 13a, 13b do not rest against the tool shank 7a and do not jam the tool shank 7a in the holding device 11. In the holding position of the locking pawls 13a, 13b, the tool 7 can move axially in the holding device 11. As shown in FIG. 2, the locking pawls 13a, 13b virtually rest against the tool shank 7a in the holding position.

As indicated in FIG. 2, the release device 14 is configured as a sleeve and is positioned around the locking pawls 13a, 13b. The release device 14 configured as a sleeve can be moved in a direction F counter to the force of a spring 19 from a first position to a second position. In the first position, the release device 14 has the effect that the locking pawls 13a, 13b virtually rest against the tool shank 7a located in the holding device 11 and thus hold the tool 7 in the holding device 11. The spring 19 presses the release device 14 counter to the direction F in the first position and thus presses the locking pawls 13a, 13b in the direction of the tool shank 7a. When the release device 14 is pressed in the direction F counter to the spring force of the spring 19, the release device 14 no longer exerts a force on the locking pawls 13a, 13b, and so the locking pawls 13a, 13b are radially movable. In other words: the locking pawls 13a, 13b can be moved from the holding position to the release position when the release device 14 is in the second position. In the release position, the tool shank 7a can be removed from the holding device 11 counter to the direction F.

FIGS. 2 and 3 show the tool cap according to a first exemplary embodiment.

The tool cap 12 is likewise configured as a sleeve and positioned in front of the release device 14 in the direction F. In this case, the tool cap 12 is provided as a holder and serves to hold the tool fitting device 3 when, for example, the release device 14 is moved in the direction F. Furthermore, the tool cap 12 also prevents dust or dirt from being able to penetrate into the interior of the tool fitting device 3. According to the first exemplary embodiment, the tool cap 12 comprises a protruding element 12a and a receiving element 12b. As described in more detail below, the receiving element 12b of the tool cap 12 is configured to receive a protruding element 20a of the dust protection device 20. The protruding element 12a and receiving element 12b of the tool cap 12 form a component of a snap-action connection between the tool cap 12 and dust protection device 20.

As indicated in FIG. 2, the damping element 15 is configured in a substantially annular manner and is positioned under preload between the tool cap 12 and the holding device 11. The damping element 15 consists of a resilient material, for example an elastomer, and serves, inter alia, to damp vibration in the tool fitting device 3. Since the damping element 15 is positioned under preload between the tool cap 12 and the holding device 11, the damping element 15 furthermore exerts a force or a pressure in the axial direction on adjacent parts. As a result, there is a stress or pressure in the tool fitting device 3, with the result that the individual components or parts of the tool fitting device 3 are pressed against one another. As described below, the damping element 15 interacts with the retention element 17 (see, e.g., FIG. 3) in order to introduce a preload into the tool fitting device 3.

Furthermore, the damping element 15 serves to damp force peaks or pulses in the event of an idle strike during the use of the power tool 1 configured as a chipping hammer.

Moreover, as shown in FIG. 2, the holding ring is positioned in front of the tool cap 12 in the direction F and around the holding device 11. The first and second holding rings 16a, 16b are configured in a substantially annular manner and serve, in conjunction with the retention element 17, to fix the tool cap 12 on the holding device 11. As shown in FIG. 3, the retention element 17 is positioned between the first and second holding rings 16a, 16b. Both the first and the second holding ring 16a, 16b have a sector-shaped recess 16s, giving rise to a concave outer surface. In this case, the shape and position of this recess 16s are chosen such that the retention element 17 fits on or into the first and second holding rings 16a, 16b.

As shown in FIGS. 2 to 5, the retention element 17 is configured as a snap ring and is positioned between the first and second holding rings 16a, 16b in the direction F. The retention element 17 configured as a snap ring serves to hold or fix the first and second holding rings 16a, 16b and the tool cap 12 on the holding device 11. The holding device 11 has a corresponding depression V in the form of a groove at the height or location of the snap ring 17. The snap ring 17 fits in the groove V.

FIGS. 2 and 3 illustrate a tool fitting device 3 according to a first embodiment. According to the first embodiment, both the dust protection device 20 and the tool cap 12 have specific configurations, which are described below.

The dust protection device 20 serves to prevent the penetration of dust into the tool fitting device 3 and is configured substantially as a frustoconical cap with a central through-hole 21. In this case, the dust protection device 20 consists at least partially of a resilient material, which may also be referred to as an elastomer.

Furthermore, the dust protection device 20 comprises substantially a front end 24a, a rear end 24b, a dust stripping element 22, a protruding element 20a and a receiving element 20b.

The dust stripping element 22 is positioned at the front end 24a of the dust protection device 20 or at the central through-hole 21 and serves to prevent the penetration of dust between the tool shank 7a and the dust protection device 20. To this end, the dust stripping element 22 has a collar element 30 with an encircling waist 31. For sealing purposes, the collar element 30 rests against the tool shank 7a. As a result of the waist 31, the collar element 30 is movable in an axial direction, such that vibration acting on the collar element 30 can be compensated and the collar element 30 does not come away or detach from the tool shank 7a in a radial direction.

As is apparent from FIGS. 2 and 3, the protruding element 20a of the dust protection device 20 is configured substantially as a hook for introducing into a receiving element 12b on the tool cap 12. The receiving element 20b of the dust protection device 20 is configured to receive the protruding element 12a of the tool cap 12. The protruding element 20a and receiving element 20b of the dust protection device 20 correspond respectively to the receiving element 12b and protruding element 12a of the tool cap 12 and therefore form a component of the snap-action connection between the tool cap 12 and dust protection device 20.

By way of the corresponding protruding elements 12a, 20a and receiving elements 12b, 20b of the dust protection device 20 and of the tool cap 12, a form-fitting connection can be created between the dust protection device 20 and tool cap 12. As a result, an extensive sealing region between the dust protection device 20 and tool cap 12 is created counter to the penetration of dust into the interior of the tool fitting device 3. Since the dust protection device 20 consists at least partially of a resilient material, at least the region at or around the protruding element 20a of the dust protection device 20 can be radially deformed so as to release the snap-action connection between the dust protection device 20 and tool cap 12 and remove the dust protection device 20 from the tool fitting device 3.

In the case of the tool fitting device 3 according to the first embodiment, the dust protection device 20 is connected to the tool cap 12 such that an axial spacing A and a radial spacing B are provided. As can be seen in FIG. 3, the axial spacing A extends from the end face of the holding device 11 to the collar element 30 of the dust protection device 20. By contrast, the spacing B extends from a surface side of the holding device 11 to an inner lateral surface of the dust protection device 20. As a result of the spacings A and B, the dust protection device 20 is decoupled from the holding device 11 in a mounted state, such that no oscillation or vibration is transmitted from the holding device 11 to the dust protection device 20.

Figure 4:
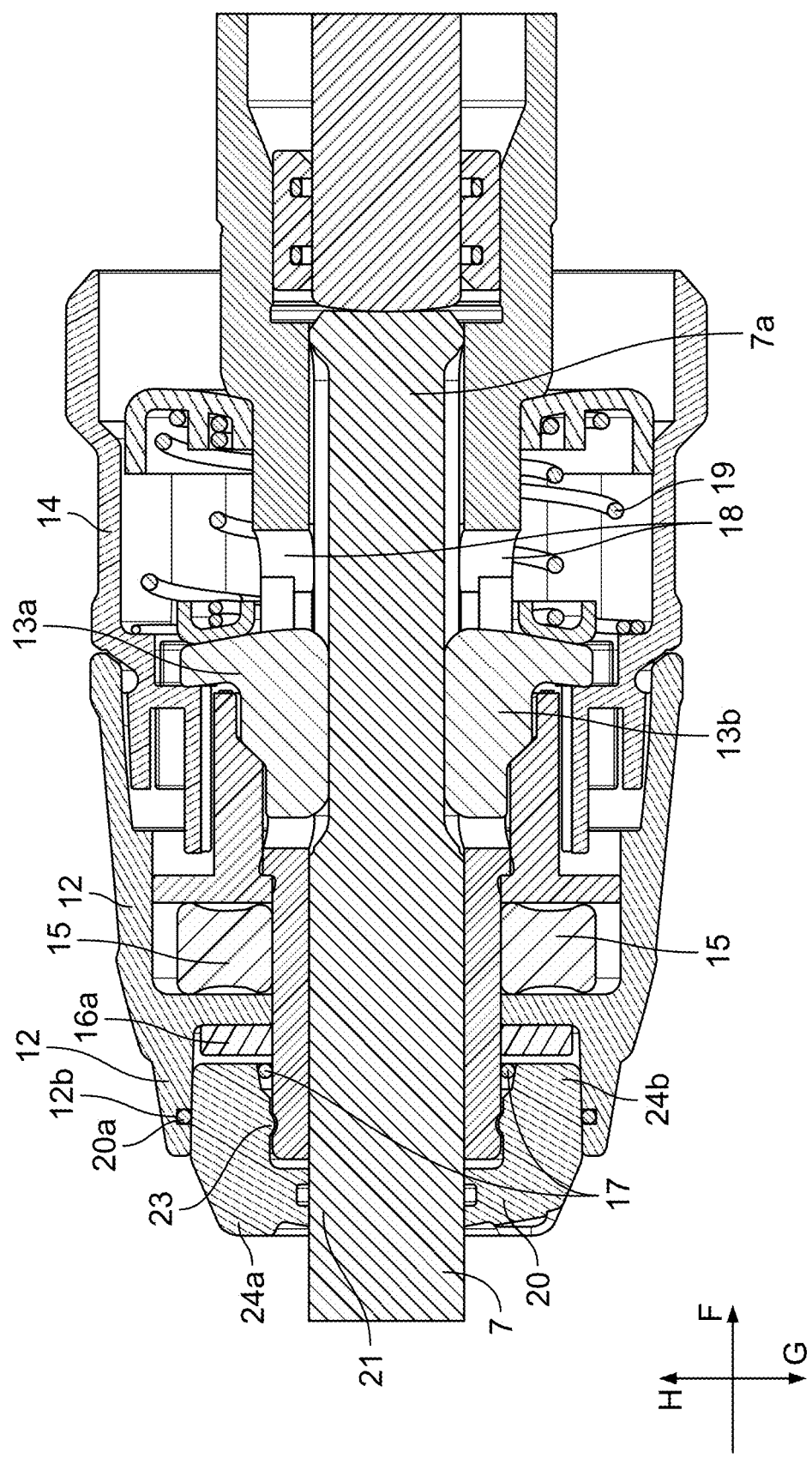
FIG. 4 shows a sectional illustration of a second embodiment of the tool fitting device according to the invention, having the dust protection device according to the invention and a tool shank inserted into the tool fitting device.
Figure 5:
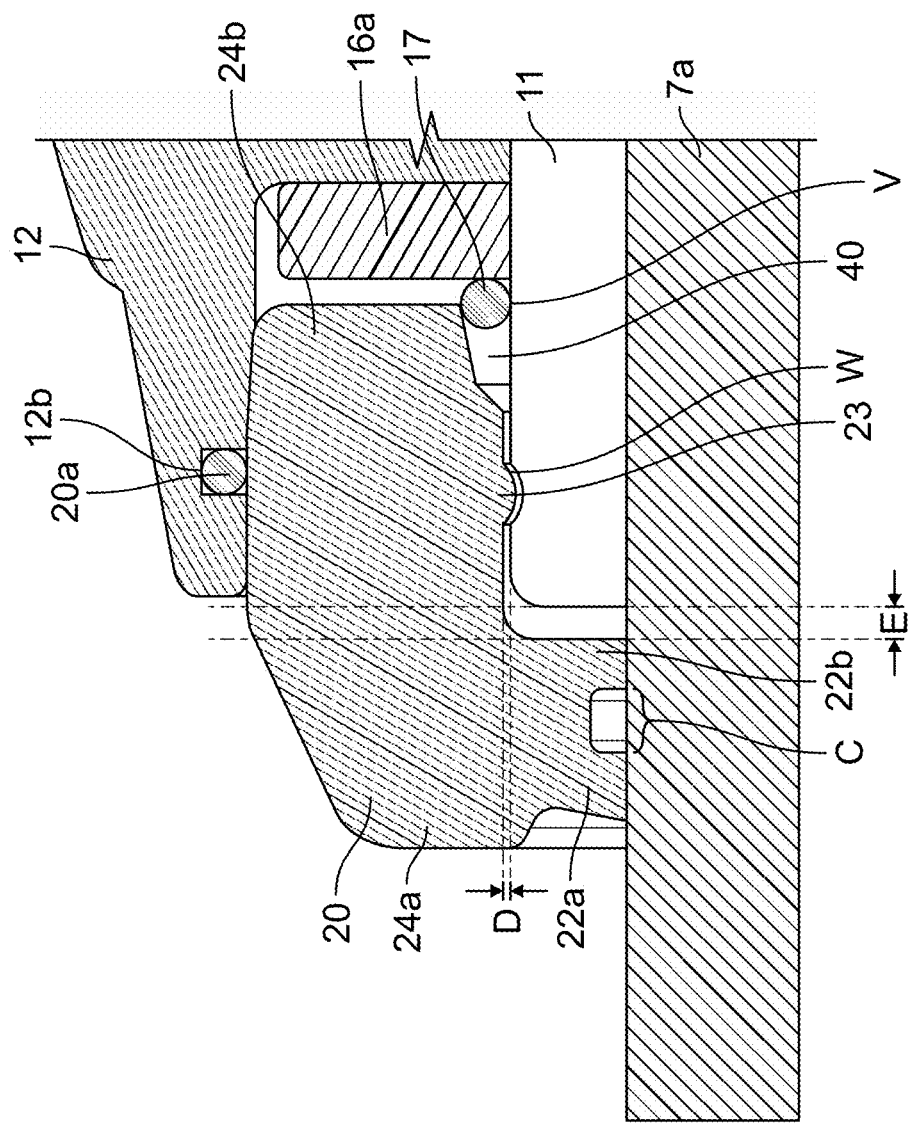
FIG. 5 shows a sectional illustration with details of the second embodiment of the dust protection device according to the invention.

FIGS. 4 and 5 illustrate a tool fitting device 3 according to a second embodiment. According to the second embodiment, both the dust protection device 20 and the tool cap 12 have specific configurations, which are described below.

The dust protection device 20 serves again to prevent the penetration of dust into the tool fitting device 3 and is likewise configured substantially as a frustoconical cap with a central through-hole 21. In this case, the dust protection device 20 consists at least partially of a resilient material, which may also be referred to as an elastomer.

In contrast to the dust protection device 20 according to the first embodiment, the dust protection device 20 according to the second embodiment comprises substantially a front end 24a, a rear end 24b, a first dust stripping element 22a, a second dust stripping element 22b, a fixing bead 23 and a protruding element 20a.

As is apparent from FIGS. 4 and 5, the first and second dust stripping elements 22a, 22b extend radially around the central through-hole 21 of the dust protection device 20 and are located in the vicinity of the first end 24a of the dust protection device 20. The first and second dust stripping elements 22a, 22b are thus configured as it were as collar elements 30 and rest with their respective free ends against the tool shank 7a. The first and second dust stripping elements 22a, 22b serve to provide sealing against penetrating dust between the tool shank 7a and the dust protection device 20. As is apparent from FIG. 5, the first and second dust stripping elements 22a, 22b are arranged at a spacing C from one another. The spacing C between the first and second dust stripping elements 22a, 22b is necessary so that the first and second dust stripping elements 22a, 22b do not come into contact with one another when vibration or oscillation acts on the first and/or second dust stripping element(s) 22a, 22b.

The protruding element 20a (see e, g, FIG. 4) of the dust protection device 20 is configured, according to the second embodiment, in the form of an elevation that extends radially around the outer surface of the dust protection device 20. The tool cap 12 has a receiving element 12b in the form of a depression for receiving the protruding element 20a of the dust protection device 20. When the dust protection device 20 is in a state mounted on the tool fitting device 3, the protruding element 20a of the dust protection device 20 is positioned in the receiving element 12b of the tool cap 12 such that there is a form-fitting connection between the dust protection device 20 and the tool cap 12.

As is apparent from FIG. 5, the fixing bead 23 is positioned on the inner lateral surface of the dust protection device 20 radially around the central through-hole 21. Provided on the holding device 11 is a depression W, corresponding to the fixing bead 23, in the form of a groove extending around the holding device 11. When the dust protection device 20 is in a state mounted on the tool fitting device 3, the fixing bead 23 is positioned at a radial spacing D at the height of the depression W. The spacing D serves to prevent the fixing bead 23 and the holding device 11 from coming into contact with one another when vibration acts on the holding device 11 while the power tool 1 is being used. As a result, the vibration is not transmitted from the holding device 11 to the dust protection device 20.

Furthermore, the dust protection device 20 has, at the rear end 24b, a frustoconical recess 40 extending around the holding device 11. The recess 40 prevents the rear end 24b of the dust protection device from coming into contact with parts of the tool fitting device 3 when vibration acts on the tool fitting device 3.

As a result of the use of a resilient material for the dust protection device 20 and of the spacing D, the dust protection device 20 can be removed from the tool fitting device 3.

LIST OF REFERENCE SIGNS

1 Power tool
2 Housing
2a Front end of the housing
2b Rear end of the housing
3 Tool fitting device
4 Drive
5 Impact mechanism
7 Tool
7a Rear end of the tool; tool shank
8 Handle
9 Activation switch
10 Mains cable connection
11 Holding device
12 Tool cap
12a Protruding element of the tool cap
12b Receiving element of the tool cap
13a Locking pawl
13b Locking pawl
14 Release device
15 Damping element
16a First holding ring
16b Second holding ring
16s Sector-shaped recess on the holding ring
17 Retention element
18 Openings in holding device
19 Spring
20 Dust protection device
20a Protruding element of the dust protection device
20b Receiving element of the dust protection device
21 Central through-hole in the dust protection device
22 Dust stripping element
22a First dust stripping element
22b Second dust stripping element
23 Fixing bead
24a Front end of the dust protection device
24b Rear end of the dust protection device
30 Collar element
31 Waist
40 Recess in the dust protection device
A Axial spacing between the dust protection device and holding device
B Radial spacing between the dust protection device and holding device
C Axial spacing between the dust stripping elements
D Radial spacing between the dust protection device and holding device
E Axial spacing between the dust protection device and holding device

What is claimed is:

1. A tool fitting device for a power tool, the tool fitting device comprising: a holder for receiving and holding a tool shank; a tool cap; and a dust protector for preventing the penetration of dust into the tool fitting device, the tool cap including at least one receiver and the dust protector including at least one protrusion corresponding to the receiver, such that the tool cap and the dust protector are connectable together in a form-fitting manner; wherein the dust protector includes an annular fixing bead and the holder includes a depression corresponding to the fixing bead for axially holding the dust protector on the holder; wherein a radial spacing or an axial spacing is provided between the dust protector and the holder, the dust protector always being separated or decoupled from the holder so that no vibration or oscillation is transmitted from the holder to the dust protector.

2. The tool fitting device as recited in claim 1 wherein the dust protector including at least one further receiver and the tool cap included at least one further protrusion protruding corresponding to the further receiver.

3. The tool fitting device as recited in claim 1 wherein the dust protector is formed at least partially from a resilient material.

4. The tool fitting device as recited in claim 1 wherein the dust protector includes a front and a rear end, at least one dust stripper being provided at the front end and a frustoconical recess extends around the holder at the rear end.

5. The tool fitting device as recited in claim 1 wherein when the dust protector is in a state mounted on the tool fitting device, the fixing bead is positioned at a radial spacing at a height of the depression, the radial spacing preventing the fixing bead and the holder from coming into contact with one another when vibration acts on the holder while the power tool is being used.

6. A method for a tool fitting device as recited in claim 1 comprising fitting the dust protector in a form fitting manner on the tool cap.

7. A dust protector for preventing the penetration of dust into the tool fitting device as recited in claim 1, the dust protector comprising at least one protrusion corresponding to the receiver, such that the tool cap and the dust protection device are connectable together in a form-fitting manner.

8. A chipping hammer comprising the tool fitting device as recited in claim 1.

* * * * *